United States Patent
Anderson et al.

(10) Patent No.: US 8,509,086 B2
(45) Date of Patent: Aug. 13, 2013

(54) DETECTING NETWORK MISUSE

(75) Inventors: Thomas E. Anderson, Seattle, WA (US); David J. Wetherall, Seattle, WA (US); Stefan R. Savage, Carlsbad, CA (US)

(73) Assignee: Arbor Networks, Inc.

( * ) Notice: Subject to any disclaimer, the term of this patent is extended or adjusted under 35 U.S.C. 154(b) by 2431 days.

(21) Appl. No.: 10/176,845

(22) Filed: Jun. 20, 2002

(65) Prior Publication Data

US 2003/0002436 A1    Jan. 2, 2003

Related U.S. Application Data

(60) Provisional application No. 60/299,809, filed on Jun. 20, 2001.

(51) Int. Cl.
*G01R 31/08* (2006.01)
*H04L 12/54* (2013.01)

(52) U.S. Cl.
CPC ................................ *H04L 12/56* (2013.01)
USPC ................................................. 370/236.1

(58) Field of Classification Search
USPC ............... 370/400, 397, 225, 226, 227, 228, 370/238, 238.1, 248, 249, 252, 437, 352, 370/236.1
See application file for complete search history.

(56) References Cited

U.S. PATENT DOCUMENTS

| | | | |
|---|---|---|---|
| 4,931,941 A * | 6/1990 | Krishnan | 379/112.05 |
| 5,280,470 A | 1/1994 | Buhrke et al. | 370/13 |
| 5,367,523 A | 11/1994 | Chang et al. | 370/84 |
| 5,633,859 A | 5/1997 | Jain et al. | 370/234 |
| 5,805,577 A | 9/1998 | Jain et al. | 370/234 |
| 5,983,278 A | 11/1999 | Chong et al. | 709/235 |
| 6,069,894 A * | 5/2000 | Holender et al. | 370/397 |
| 6,385,201 B1 * | 5/2002 | Iwata | 370/400 |
| 6,405,250 B1 * | 6/2002 | Lin et al. | 709/224 |
| 6,477,582 B1 * | 11/2002 | Luo et al. | 709/241 |
| 6,542,466 B1 * | 4/2003 | Pashtan et al. | 370/235 |
| 6,578,147 B1 * | 6/2003 | Shanklin et al. | 726/22 |
| 6,704,874 B1 * | 3/2004 | Porras et al. | 726/22 |
| 6,765,864 B1 * | 7/2004 | Natarajan et al. | 370/224 |
| 7,058,015 B1 * | 6/2006 | Wetherall et al. | 370/236 |
| 2002/0145981 A1 * | 10/2002 | Klinker et al. | 370/244 |

* cited by examiner

*Primary Examiner* — Ricky Ngo
*Assistant Examiner* — Phuongchau B Nguyen
(74) *Attorney, Agent, or Firm* — Edwards Wildman Palmer LLP; Scott D. Wofsy; Christopher J. Capelli

(57) ABSTRACT

An apparatus is equipped to receive network traffic data for network traffic routed over one or more network links relevant to a network link. Selected numbers of analysis are performed to determine if the network link of interest is being misused. The analyses include but are not limited to analyses to determine whether the network traffic routed are inconsistent with an expected traffic pattern, whether unallocated source addresses are present, whether source addresses exhibit an uncharacteristic even distribution pattern, whether a server is uncharacteristically excessive in responding to the same source address, whether normal bursty behavior is absent from the traffic, whether a ratio of packets in one direction to packets in another direction is out of balance, whether a ratio of packets of one type to packets of another type is out of balance, and whether a server is uncharacteristically excessive in responding with error responses.

64 Claims, 6 Drawing Sheets

DETECTING NETWORK MISUSE

BACKGROUND OF THE INVENTION

1. Field of the Invention

The present invention relates to the field of networking. More specifically, the present invention relates to the detection of network misuses, such as denial-of-service attacks.

2. Background Information

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular interest is the TCP/IP based global inter-networks, Internet.

As a result of this trend of increased connectivity, an increasing number of applications that are network dependent are being deployed. Examples of these network dependent applications include but are not limited to, email, net based telephony, world wide web and various types of e-commerce. For these applications, success inherently means high volume of network traffic for their implementing servers. To ensure continuing success, quality of service through orderly and efficient handling of the large volume of network traffic has become of paramount importance. Various subject matters, such as scalability, distributive deployment and caching of contents as well as preventing network misuse have become of great interest to the artesian.

SUMMARY OF THE INVENTION

An apparatus is equipped to receive network traffic data relevant for network traffic routed over a network link. Selected numbers of analyses are performed to determine whether the network link is being misused. The analyses include but are not limited to analyses to determine whether the network traffic routed are inconsistent with an expected traffic pattern, whether unallocated source addresses are present, whether source addresses exhibit an uncharacteristic even distribution pattern, whether a server is uncharacteristically excessive in responding to the same source address, whether normal bursty behavior is absent from the traffic, whether a ratio of packets in one direction to packets in another direction is out of balance, whether a ratio of packets of one type to packets of another type is out of balance, and whether a server is uncharacteristically excessive in responding with error responses.

In one embodiment, network traffic data are collected for network traffic routed over the related network links as well as the network link of interest. In one embodiment, distributed sensors are employed to collect and provide the network traffic data. The distributed sensors are selectively activated/deactivated based on the results of the analyses. In one embodiment, in like manner, routing devices are selectively regulated to regulate the network traffic being routed over the network link. In one embodiment, the regulations and de-regulations are administered via the corresponding sensors.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as receiving, analyzing, determining, instructing, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Parts of the description will be described using various acronyms, including but are not limited to:

| | |
|---|---|
| ATM | Asynchronous Transfer Mode |
| DNS | Domain Name Service |
| IP | Internet Protocol |
| SONET | Synchronous Optical Network |
| TCP | Transmission Control Protocol |

The terms "routing devices" and "route" are used throughout this application, in the claims as well as in the specification. The terms as used herein are intended to be genus terms that include the conventional routers and conventional routing, as well as all other variations of network trafficking, such as, switches or switching, gateways, hubs and the like. Thus, unless particularized, the terms are to be given this broader meaning.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Further, the description repeatedly uses the phrase "in one embodiment", which ordinarily does not refer to the same embodiment, although it may.

Overview

Figure 1:
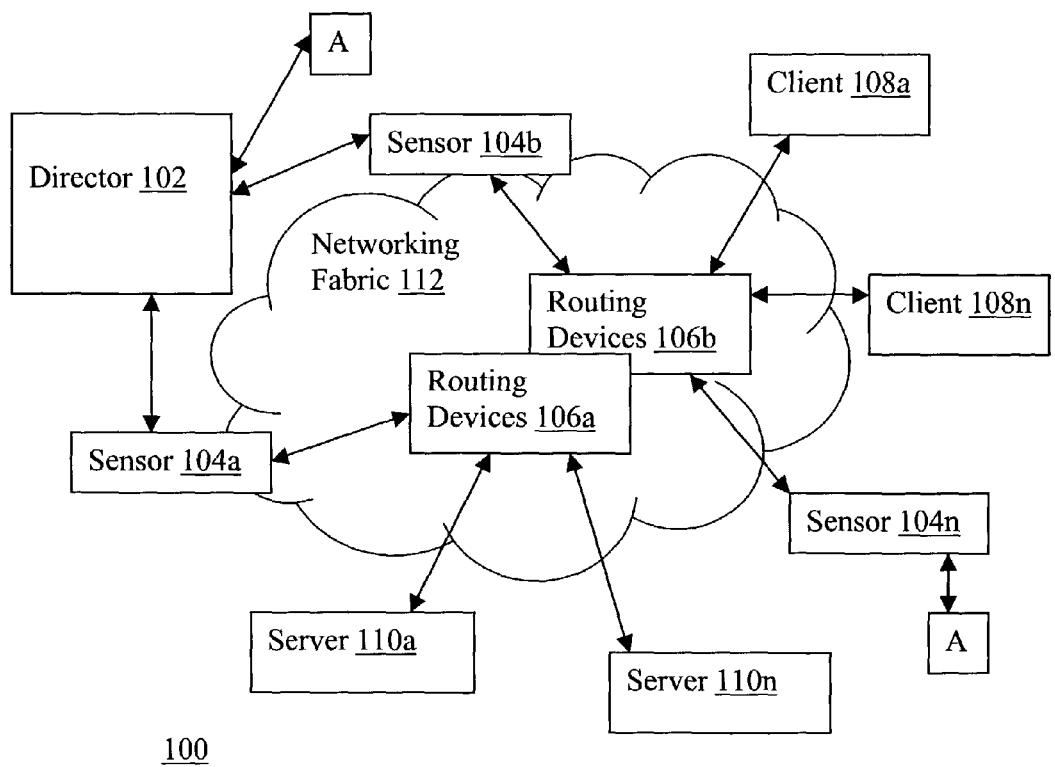
FIG. 1 illustrates a network view of the present invention, in accordance with one embodiment.

Referring now to FIG. 1, wherein a block diagram illustrating a network view of the present invention, in accordance with one embodiment, is shown. As illustrated, client devices 108a-108n are coupled to servers 110a-110n through networking fabric 112, which includes a number of routing devices 106a-106n coupled to each other forming a plurality of network links. Client devices 108a-108n, via routing devices 106a-106n, or more specifically, over the network links formed by routing devices 106a-106n, selectively access servers 110a-110n for services. Unfortunately, as those skilled in the art would appreciate, the same network links that make servers 110a-110n readily accessible to client devices 108a-108n also render them vulnerable to abuse or misuse by one or more of client devices 108a-108n. For example, one or more client devices 108a-108n may individually or in combination launch an attack, such as a denial of service attack, or otherwise victimize one or more servers 110a-110n, routing devices 106a-106b and/or the links interconnected the elements. In accordance with the present invention, director 102, complemented by a number of sensors 104a-104n, are employed to detect and prevent such abuse or misuse of the network links, to be described more fully below. For the illustrated embodiment, sensors 104a-104n are disposed in distributed locations. In alternate embodiments, some or all of sensors 104a-104n may be integrally disposed with routing devices 106a-106b.

Example network 112 represents a broad range of private as well as public networks or interconnected networks, such as an enterprise network of a multi-national corporation, or the Internet. Networking nodes, such as clients 108a-108n and server 110a-110n represent a broad range of these elements known in the art, including individual user machines, e-commerce sites, and the like. As alluded to earlier, routing devices 106a-106n represent a broad range of network trafficking equipment, including but are not limited to conventional routers, switches, gateways, hubs and the like.

While for ease of understanding, only one director 102, and a handful each of network nodes, clients 108a-108n and servers 110a-110n, routing devices 106a-106n and sensors 104a-104n are included in the illustration, from the description to follow, those skilled in the art will appreciate that the present invention may be practiced with more than one director 102 as well as more or less network nodes, routing devices 106a-106n and sensors 104a-104n. In particular, the present invention may also be practiced with one or more directors 102. When more than one director 102 is employed, each director 102 may be assigned responsibility for a subset of sensors 104a-104n, and the directors 102 may relate to each other in a master/slave relationship, with one of the directors 102 serving as the "master" (and the others as "slave"), or as peers to one another or organized into an hierarchy, to collective discharge the responsibilities described below.

Method

Figure 2:
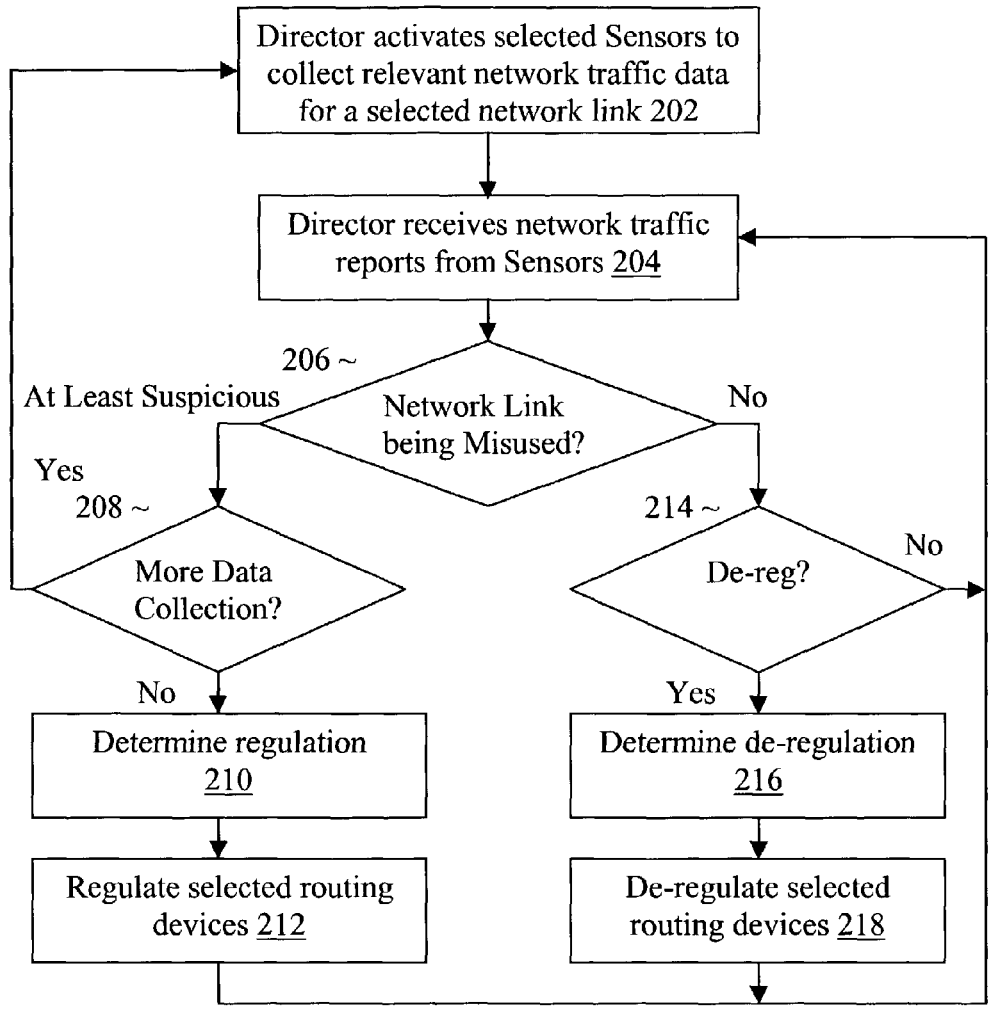
FIG. 2 illustrates a method view of the same invention, in accordance with one embodiment.

Referring now also to FIG. 2, wherein a method view of the present invention, in accordance with one embodiment is shown. As illustrated, for a network link of interest, e.g. a network link on a critical path to a server subscriber of the services offered by director 102, director 102 activates an initial subset of sensors 104a-104n to monitor and collect descriptive data for network traffic routed over the network link of interest and/or related links, block 202. The selected ones of sensors 104a-104n may monitor the routing devices 106* that are directly responsible for routing traffic onto the network link of interest, that is the routing devices 106* to which the network link of interest is directly attached, and/or monitoring the routing devices 106* that are indirectly responsible for routing traffic onto the network link of interest, that is the routing devices 106* are remotely disposed, however by virtue of the destination of the traffic being routed, the traffic will eventually be routed over the network link of interest. The selected ones of sensors 104a-104n may also monitor related network links, which traffic patterns may be indicative of the nature of the network traffic being routed over the network link of interest. [The asterisk employed in the afore description and the description to follow represents a "wildcard" portion for the reference, i.e. 106* may be any one or more of 106a through 106n.]

Periodically, or on demand, director 102 receives from the activated sensors 104* descriptive data associated with the traffic of interest, i.e. network traffic routed over the network link of interest and/or related network links, block 204. In response, for the illustrated embodiment, director 102 determines whether the network link of interest is at least suspicious of being abused or misused, block 206. In various implementations, director 102 performs one or more analyses, using the received descriptive data, to determine whether the network link of interest is at least suspicions of being abused or misused.

The descriptive data provided and the analyses performed are interdependent on each other. The precise nature of the descriptive data provided and the interdependent analyses performed are application dependent, i.e. dependent on the type and/or protocol of the network, and/or interest of the service subscriber. Examples of descriptive data include source addresses, destination addresses, packet types, packet sizes, volume of packets, and so forth. Volume of packets as well as other description data may also be stratified by packet types, addresses, and other stratification criteria.

If it is determined that the network link of interest is at least suspicious of being abused or misused, director 102 further determines whether additional monitoring or data collection are needed before definitively concluding that the network link of interest is being misused, and imposes selective regulations to impact on network traffic accordingly, block 208. If additional monitoring or data collection is "preferred", director 102 launches additional selected ones of sensors 104a-104n to perform the additional monitoring to collect additional data to confirm that indeed the network link of interest is being misused, i.e. returning to block 202.

If additional collection of data is not desired or eventually upon collection of additional data, director 102 becomes sufficiently confident that the network link of interest is being misused, at such time, director 102 determines the location or locations, and amount of regulations to impact on network traffic, to thwart the network link of interest from being misused, block 210-212.

Back at block 206, if director 102 is not at least suspicious of the network link of interest is being abused, director 102 further determines if any regulation is in effect, and if so, whether any of the regulation may be relaxed, block 214. If not, the process continues back at block 204, where director 102 receives additional report of descriptive data associated with the network traffic routed over the network link of interest and/or related links. From there, director conditionally repeats the earlier described analyses and related operations, blocks 206-214. Eventually, director 102 determines at block 214 that at least a portion of the regulation in effect may be relaxed. At such time, director 102 determines the location or locations of de-regulation, and the amount of de-regulation at the respective selected locations, block 216-218.

The above described method is repeated by director 102 periodically for each of the network links of interest. Before proceeding to describe the present invention further, it should be noted that the phrase network link as used in the present application includes a virtual link as well as a physical link. A virtual link is a collection of physical links. When the network link is a virtual link, director 102 performs the analyses to be described based on the aggregated descriptive data of the corresponding physical links.

Further, distributed sensing and regulation of network traffic are the subject matters of co-pending U.S. patent applications, Ser. No. 09/631,898, entitled "A Distributed Solution For Regulating Network Traffic", filed on Aug. 4, 2000, and Ser. No. 09/685,518, entitled "Progressive and Distributed Regulation of Selected Network Traffic Destined for a Network Node", filed on Oct. 9, 2000, respectively. These applications are hereby fully incorporated by reference.

Detection Analyses

Continuing to refer to FIG. 2, as described earlier, in response to the receipt of a new "round" or set of descriptive data associated with network traffic relevant to the network link of interest (provided periodically or on demand), director 102 performs one or more analyses in determining whether the network link of interest is at least suspicious of being misused.

In one embodiment, director 102 determines whether a network link of interest is being misused by comparing the traffic pattern depicted by the provided descriptive data against a set of "user-defined" thresholds for a plurality of traffic pattern metrics. More specifically, director 102 concludes that the network link is at least suspicious of being misused if the traffic pattern metrics as measured by the received descriptive data exceed the "user-defined" thresholds. In this embodiment, the service subscriber quantitatively defines for director 102 the "good" traffic it expects on the network link of interest. The definition may be effectuated using any operational specification techniques known in the art. Traffics exceeding the defined level are deemed to be "suspicious". For example, a subscriber may define that a network link of interest is to have no more than 50 Mb/s of DNS traffic and 1 Mb/s of TCP zone transfers. Thus, if director 102 receives reporting from sensors 104* that infer a high volume of traffic for either one of these metrics, director 102 will at least deem the traffic being routed over the network link of interest as suspicious, and increase monitoring. If the excessive pattern persists for a predetermined period, director 102 will deem the network link as being misused, and regulate it accordingly.

In one embodiment focusing specifically on IP traffics, director 102 determines whether a network link of interest is being misused in accordance with whether unallocated IP addresses are present as source addresses of the traffic routed over the network link of interest. Such presence is likely, as an attacker often uses randomly generated addresses as source addresses of the attack traffic. Such randomly generated source addresses are likely to include source addresses that are unallocated. The allocated addresses may be pre-provided to director 102 (e.g. in the form of a database) or may be pre-determined by director 102 by systematically pinging trial addresses for responses (and saving the responded IP addresses in a database).

In one embodiment, director 102 determines whether a network link of interest is being misused in accordance with the distribution profile of the source addresses of the network traffic routed over the network link of interest. More specifically, director 102 considers the network link of interest is at least suspicious of being misused if the source addresses of the network traffic routed over the network link of interest are evenly layered on top of the normal traffic pattern, which typically involves only a relatively small subset of source addresses. Such characteristic is likely, as an attacker tends to use randomly generated addresses as source addresses of the attack traffic. Such randomly generated source addresses tend to be evenly distributed. Any one of a number of statistical techniques known in the art may be employed to perform the above described distribution profile analysis.

In one embodiment, director 102 determines whether a network link of interest is being misused in accordance with the number and type of packets being sent to a network node or set of nodes from the same source address. More specifically, director 102 considers the network link of interest is at least suspicious of being misused if the number of packets being sent to a network node or set of nodes from the same source address for certain type of packets exceeds a predetermined small threshold. Such characteristic is likely in situations where certain servers, such as domain name servers, are being used to launch attack packets against a victim server.

In one embodiment, director 102 determines whether a network link of interest is being misused in accordance with the burstiness characteristics of the network traffic routed over the network link of interest, more specifically, the lack thereof. Such lack of burstiness characteristic is likely in traffic intensity, intensity per subnet, packet sizes, and/or number of packets per flow, if the traffics routed are attack traffic as opposed to normal traffic. Similarly, any one of a number of statistical techniques known in the art may be employed to perform the above described burstiness analysis.

In one embodiment, director 102 determines whether a network link of interest is being misused in accordance with a ratio of the packets flowing in one direction to packets flowing in the opposite direction. More specifically, director 102 considers the network link of interest is at least suspicious of being misused if the ratio is imbalanced, i.e. more than a predetermined threshold deviated from the numeric constant "1". Again such uneven characteristic between the two directions is likely when the network traffics routed are attack traffic as opposed to normal network traffic.

In one embodiment, director 102 determines whether a network link of interest is being misused in accordance with a ratio of a first packet type to a second packet type. More specifically, director 102 considers the network link of interest is at least suspicious of being misused if the ratio is imbalanced, i.e. more than a predetermined threshold deviated from a target ratio. Such uneven characteristic between the selected pairs of packet types may be indicative of attack traffic. For example, in the case of TCP/IP, during normal operation, TCP ACK packets should be about half of data packets. If the ratio is substantially different from the target ratio of 0.5, it is likely the abnormal traffics are attack traffic.

In one embodiment, director 102 determines whether a network link of interest is being misused in accordance with response traffics. More specifically, director 102 considers the network link of interest is at least suspicious of being misused if an excess amount of the traffic being routed is recognizable error packets. For example, in the case of TCP/IP traffic, if an excessive amount of RST packets are being routed, which may be indicative of an excess amount of ACK packets being sent without the corresponding SYN packets.

When multiple analyses are employed for the decision making process, a weighted approach may be employed to give different weights to the results of the different analyses in their contributions towards the ultimate conclusion as to whether a network link of interest is at least suspicious of being misused. In alternate embodiment, a more sophisticated modeling approach may be employed instead. That is, the results of the analyses are provided as inputs to the model that models the expected normal behavior of the network links of interest, and predicts whether abnormal behavior are about to occur or occurring.

Sensors

Referring back to FIG. 1, as described earlier, sensors 104a-104n are employed to monitor and collect descriptive data associated with network traffic routed over the network links of interest. As described in the incorporated by reference application, sensors 104a-104n may be externally disposed and correspondingly coupled to and monitor routing devices 106a-106n. Alternatively, sensors 104a-104n may individually or collectively monitor and report on the network traffic routed through more than one routing device, as opposed to the corresponding configuration. In yet other embodiments, some or all of sensors 104a-104n may be integrally disposed within routing devices 106a-106h instead. Sensors 104a-104n, whether externally disposed or integrally disposed, may be coupled to director 102 using any one of a number of communication links known in the art, such as modem links over conventional phone lines, Digital Subscriber Lines (DSL), Integrated Service Digital Network (ISDN) connections, Asynchronous Transfer Mode (ASM) links, Frame Relay connections, and the like.

In one embodiment, sensors 104a-104n use an access control list (ACL), and commands associated therewith, such as "access-list" and "show access-list" to gather up the relevant data. Similarly, in one embodiment, sensors 104a-104n use interface related commands such as "show interface rate-limit" and "rate-limit" to regulate and de-regulate an interface. These commands, including their operations and constitutions, are known in the art. See product literatures from routing device manufacturers, such as CISCO Systems, Inc of San Jose, Calif.

In alternate embodiments, for certain routing devices, if supported, the relevant data gathered may also include "netflow" data. In other embodiments, the relevant data may also be obtained through known network management services, such as Simple Network Management Protocol (SNMP), Remote Monitoring (RMON), port mirroring, or packet sampling (if one or more of these service are supported by the routing devices).

For further details, refer to the specification of incorporated by reference application Ser. No. 09/631,898.

Director

Figure 3:
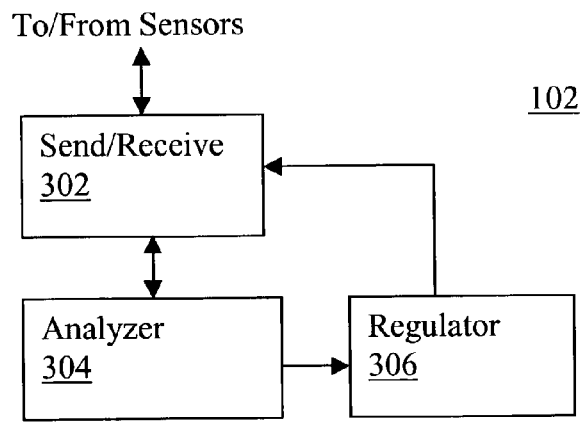
FIG. 3 illustrates a functional view of the director of FIG. 1, in accordance with one embodiment.

Referring now to FIG. 3, wherein a functional view of the director, in accordance with one embodiment is shown. As illustrated, director 102 includes send/receive function 302, analyzer 304, and regulator 306, operatively coupled to each other as shown. Send/receive function 302 is employed to receive network traffic data (e.g. reported by the distributively disposed sensors), and to send monitor instructions to the sensing devices as well as regulation/de-regulation instructions to the routing devices to be regulated (e.g. through the distributively disposed sensors). Analyzer 304 analyzes the network traffic data reported to determine if a network link of interest is at least suspicious of being misused, and alerts regulator 306 accordingly. Regulator 206 is used to determine where and the specific regulation/de-regulation actions to be taken.

Figure 4:
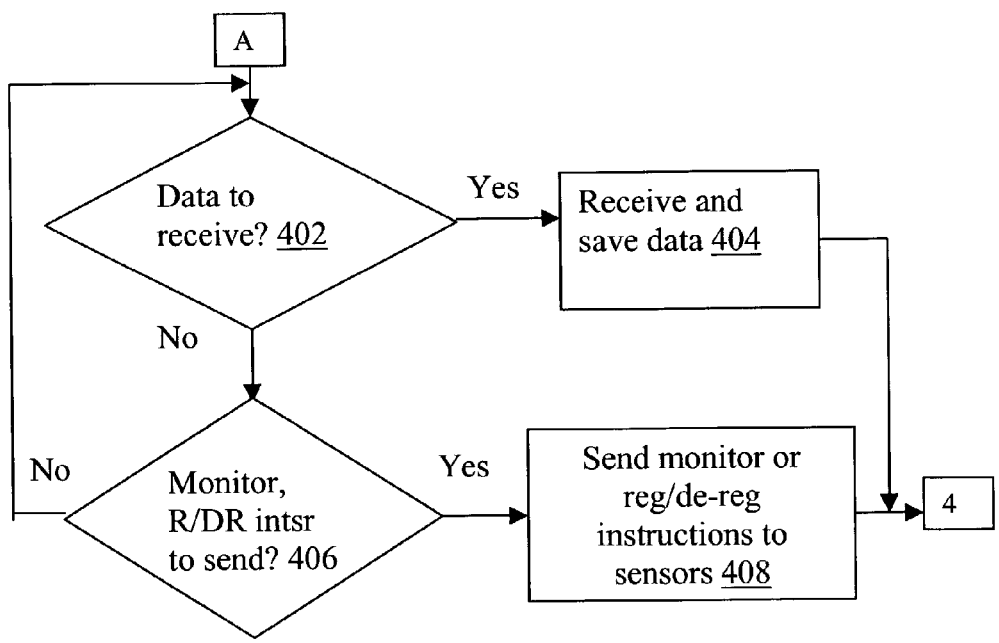
FIGS. 4-6 illustrate the operational flow of the relevant aspects of the send/receive, analyzer and regulator functions of FIG. 3, in accordance with one embodiment each.
Figure 5:
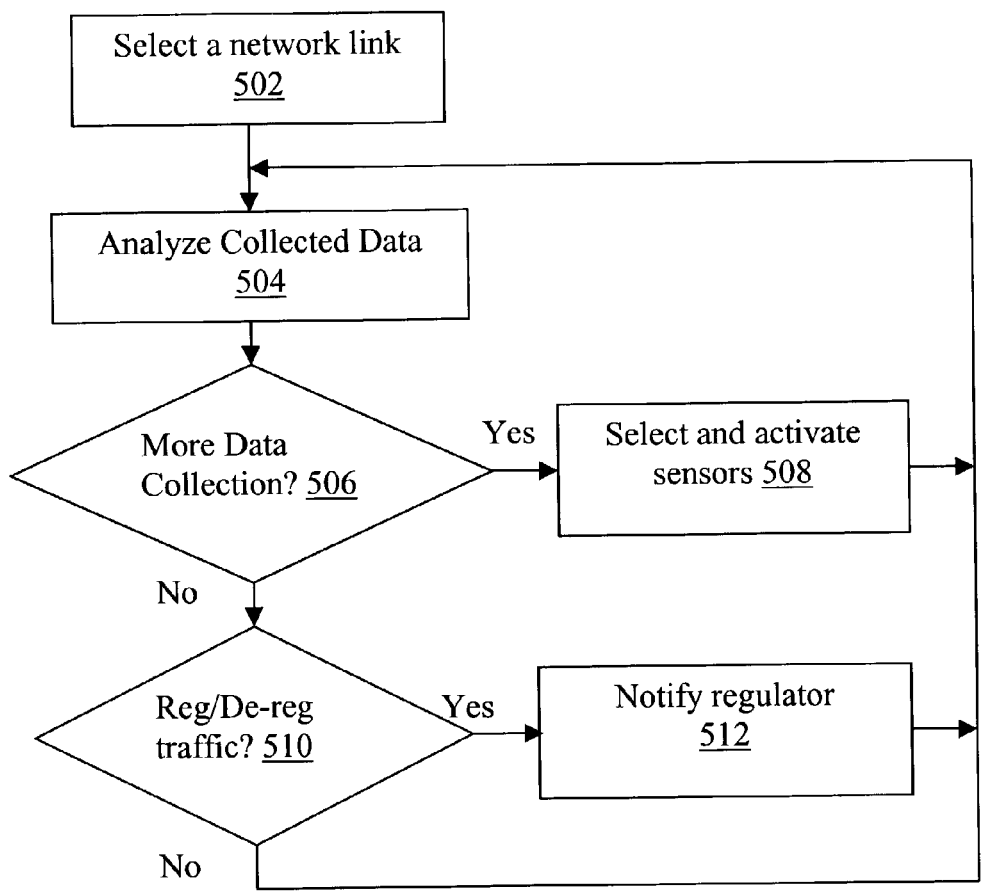
Figure 6:
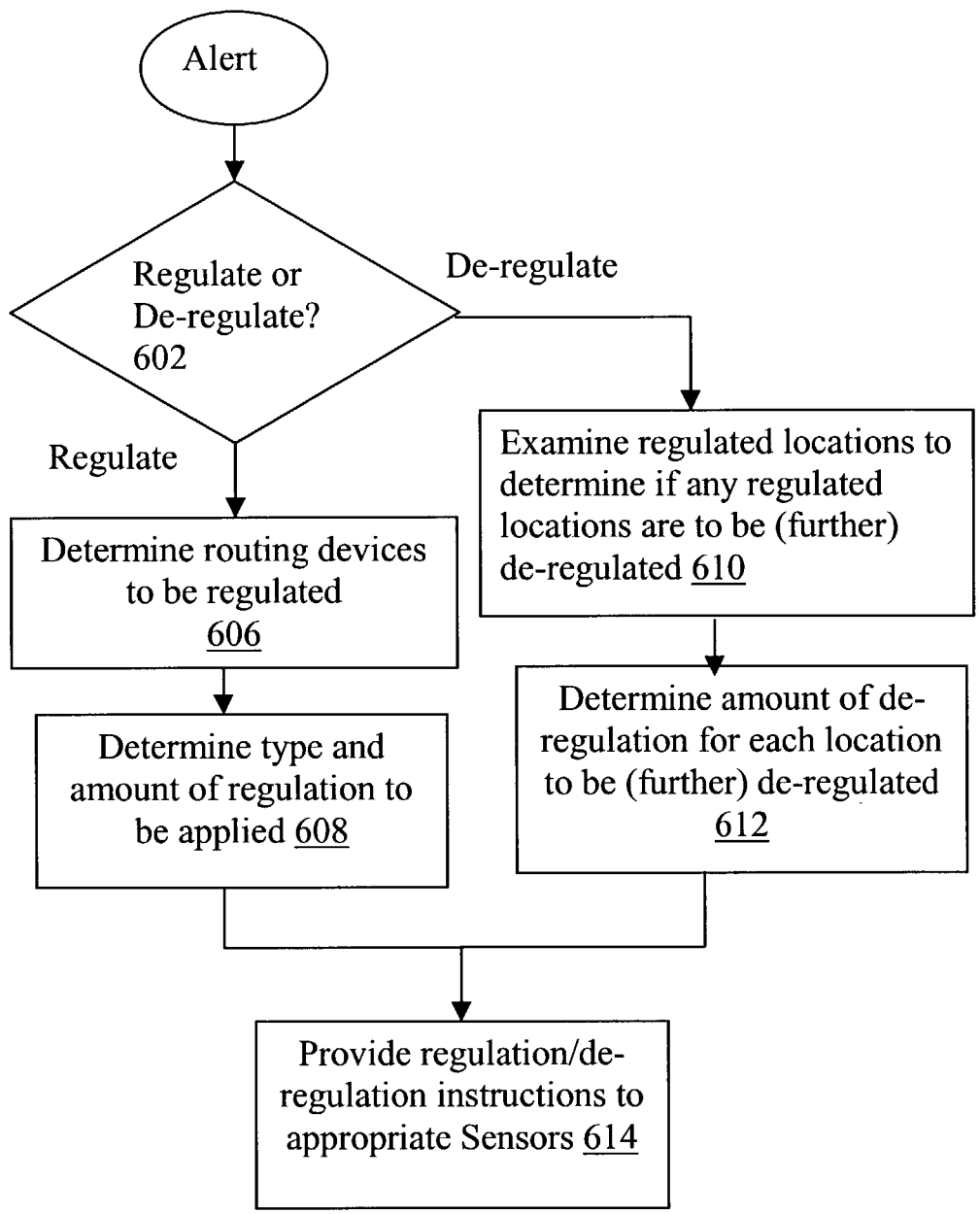

FIGS. 4-6 illustrate the operational flow of the relevant aspects of the send/receive, analyzer and regulation functions 302-306, in accordance with one embodiment each. As illustrated in FIG. 4, for the send/receive function, upon start up, it determines if there are network traffic data to be received (e.g. from the distributively disposed sensors), block 402. If there are, send/receive function 302 receives the network traffic data being reported accordingly. If there are not, send/receive function 302 determines if there are monitor or regulation/de-regulation instructions to be sent (e.g. to the distributively disposed sensors). If there are, send/receive function 302 sends the monitor or regulation/regulation instructions accordingly. If there are not, send/receive function 302 returns to block 402 to determine if there are data to be received again.

As illustrated in FIG. 5, upon start up, analyzer 304 selects a network link of interest to be analyzed, block 502. Analyzer 304 analyzes the received descriptive data, performing one or more of the earlier described analyses, block 504. Based on the results of the analysis, analyzer 304 determines if more data is to be collected, in particular, whether additional sensors 104* are to be activated for the additional collection of network traffic data, block 506. If additional sensors 104* are to be activated for the additional collection of network traffic data, analyzer 304 selects and activates selected ones of the sensors accordingly, block 508.

If sufficient number of sensors 104* have been activated for the additional collection of network traffic data, analyzer 304 further determines if network traffic are to be regulated, further regulated or de-regulated, block 510. If not, analyzer 304 returns to block 504, and continues operation from there. If network traffic is to be regulated, further regulated or de-regulated, analyzer 304 notifies regulator 306 accordingly, block 512.

Analyzer 304 repeats this process for each network link of interest to be "protected" from misuse.

As illustrated in FIG. 6, upon receipt of an alert, regulator 306 determines if the alert is for (further) regulation or de-regulation, block 602. If the alert is for (further) regulation, regulator 306 determines the routing devices to be regulated, block 606. Further, regulator 306 determines the regulation to be applied, block 608. Examples of regulations include but are not limited to bandwidth allocation, rate limiting, packet filtering, giving priority to "good" traffics, and so forth. Note that the regulations may negatively impact the "good" traffics, because as long as the "bad" traffics are more negatively impacted, the regulations would still be useful to "good" traffics.

Upon making these determinations, regulator 306 provides the regulation instructions to the routing devices to be regulated accordingly (e.g. through the sensors), block 614. On the other hand, if the alert is for de-regulation, regulator 306 determines the location or locations for de-regulation, 610. Further, regulator 306 determines the level of de-regulation (bandwidth restoration, rate limit relaxation etc.), block 612. Upon making these determinations, regulator 306 provides the de-regulation instructions to the routing devices to be de-regulated accordingly (e.g. through the sensors), block 614. In one embodiment, regulator 306 regulates and de-regulates in a progressive manner as described in incorporated by reference application Ser. No. 09/685,518.

Example Host Computer System

Figure 7:
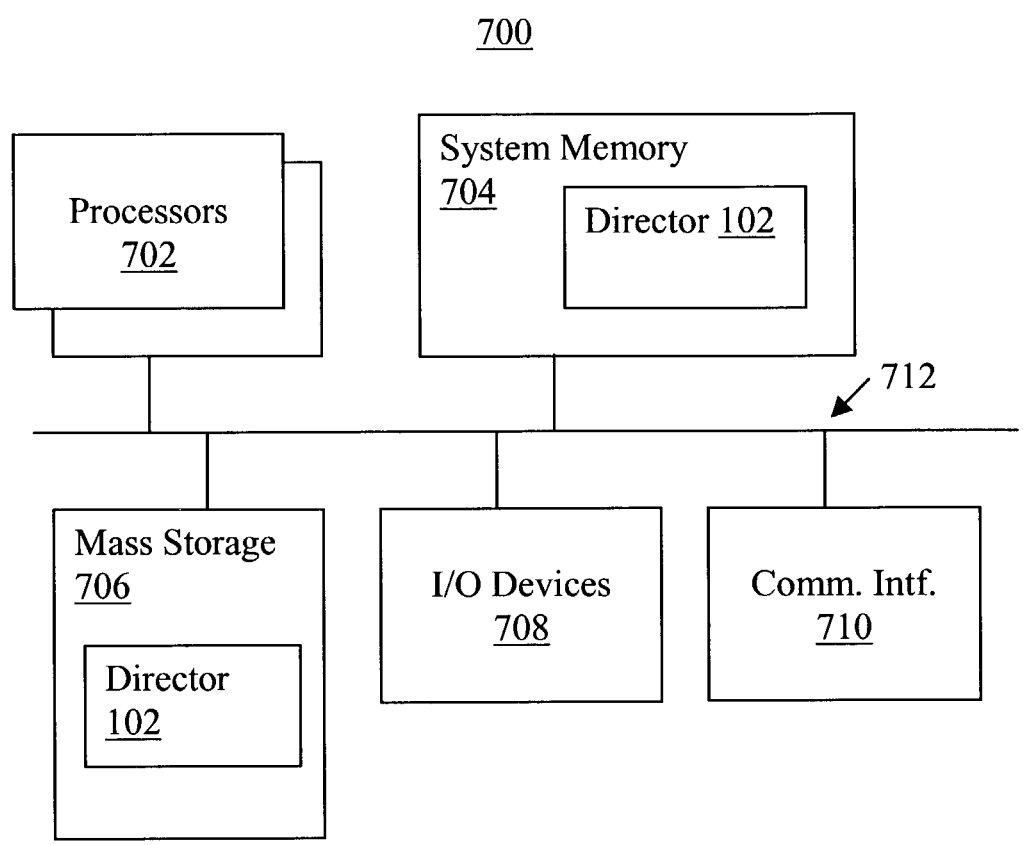
FIG. 7 illustrates an example computer system suitable for use to host a software implementation of a sensor or the director, in accordance with one embodiment.

FIG. 7 illustrates an example computer system suitable for use as either a host to a software implementation of a sensor, or the director in accordance with one embodiment. As shown, computer system 700 includes one or more processors 702 (typically depending on whether it is used as host to sensor or the director), and system memory 704. Additionally, computer system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown). Each of these elements performs its conventional functions known in the art. In particular, system memory 704 and mass storage 706 are employed to store a working copy and a permanent copy of the programming instructions implementing the sensor and/or director teachings of the present invention. The permanent copy of the programming instructions may be loaded into mass storage 706 in the factory, or in the field, as described earlier, through a distribution medium (not shown) or through communication interface 710 (from a distribution server (not shown). The constitution of these elements 702-712 are known, and accordingly will not be further described.

Conclusion and Epilogue

Thus, it can be seen from the above descriptions, a novel method and apparatus for detecting misuse of a network has been described. The novel scheme decreases the likelihood of the network links being misused to launch attacks or otherwise victimize a server node or a set of server nodes.

While the present invention has been described referencing the illustrated and above enumerated embodiments, the present invention is not limited to these described embodiments. Numerous modification and alterations may be made, consistent with the scope of the present invention as set forth in the claims to follow. Thus, the above described embodiments are merely illustrative, and not restrictive on the present invention.

What is claimed is:

1. A networking method comprising:
   receiving threshold specifications for a plurality of network traffic metrics defining an expected network traffic pattern for one or more network links relevant to a network link of interest;
   receiving network traffic data associated with said network traffic metrics; and
   determining whether said network link of interest is being misused based on said received network traffic data and said received threshold specifications for said network traffic metrics defining said expected network traffic pattern for said one or more network links relevant to said network link of interest.

2. The method of claim 1, wherein said receiving of threshold specifications comprises receiving threshold specifications for a plurality of network traffic metrics for a plurality of network traffic types.

3. The method of claim 1, wherein
   at least one of said network links is a virtual network link comprising a plurality of physical network links;
   said receiving of threshold specifications comprises receiving threshold specifications for said plurality of network traffic metrics for said virtual network link;
   said receiving of network traffic data comprises receiving network traffic data associated with said network traffic metrics for said plurality of physical network links; and
   said determining comprises aggregating said received network traffic data related to said physical network links to generate network traffic data associated with said network traffic metrics for said virtual network link.

4. The method of claim 1, wherein the method further comprises activating/deactivating monitoring of network traffic routed over one or more network links relevant to said network link of interest based at least in part on the result of said determining.

5. The method of claim 1, wherein the method further comprises activating/deactivating regulation of network traffic at one or more network nodes based at least in part on the result of said determining.

6. The method of claim 1, wherein the method further comprises repeating said receiving of network traffic data, and said determining, and automatically adjusting said received threshold specifications to be employed in a next repetition of said determining, based at least in part on the result of one or more prior performance of said determining.

7. A networking method as claimed in claim 1, further comprising:
   establishing a database of allocated IP addresses; and
   wherein said step of receiving network traffic data comprises receiving source addresses of network traffic routed over the network links relevant to the network link of interest; and
   wherein said step of determining whether said network link of interest is being misused comprises determining whether said network link of interest is being misused based on said received source addresses and said established database of allocated IP addresses.

8. The method of claim 7, wherein said establishing comprises systematically pinging IP addresses for replies.

9. The method of claim 7, wherein the method further comprises activating/deactivating monitoring of network traffic to be routed over one or more network links relevant to said network link of interest based at least in part on the result of said determining.

10. The method of claim 7, wherein the method further comprises activating/deactivating regulation of network traffic at one or more network nodes based at least in part on the result of said determining.

11. A networking method as claimed in claim 1 wherein
   said step of receiving network traffic data comprises receiving source addresses of network traffic routed over said one or more network links relevant to said network link of interest; and
said method further comprises:
   generating a distribution profile of said source addresses; and
   determining one or more characteristic measures for said distribution profile; and
and wherein the step of determining whether said network link of interest is being misused comprises determining whether said network link of interest is being misused based on said one or more characteristic measures of said distribution profile.

12. The method of claim 11, wherein said generating comprises generating said distribution profile for a subnet range.

13. The method of claim 11, wherein the method further comprises activating/deactivating monitoring of network traffic to be routed over one or more network links relevant to said network link of interest based at least in part on the result of said determining.

14. The method of claim 11, wherein the method further comprises activating/deactivating regulation of network traffic at one or more network nodes based at least in part on the result of said determining.

15. A networking method as claimed in claim 1, wherein:
the step of receiving network traffic data comprises receiving source addresses, destination addresses and traffic types of network traffic routed over the one or more network links relevant to the network link of interest;
said method further comprises determining a transmission frequency for a type of network traffic transmitted from a source address to one or more destination addresses; and
said step of determining whether said network link is being misused comprises determining whether said network link of interest is being misused based on whether said determined transmission frequency is consistent with said network traffic type.

16. The method of claim 15, wherein the method further comprises activating/deactivating monitoring of network traffic to be routed over one or more network links relevant to said network link of interest based at least in part on the result said determining.

17. The method of claim 15, wherein the method further comprises activating/deactivating regulation of network traffic at one or more network nodes based at least in part on the result of said determining.

18. A networking method as claimed in claim 1, wherein
said step of receiving network traffic data comprises receiving descriptive data associated with network traffic routed over said one or more network links relevant to said network link of interest;
said method further comprises generating at least one measurement metric that normally exhibits a bursty characteristic during normal operation; and
said step of determining whether said network link of interest is being misused comprises determining whether said network link of interest is being misused based on whether said at least one generated measurement metric exhibits said bursty characteristic.

19. The method of claim 18, wherein said at least one generated measurement metric comprises at least a selected one of traffic intensity, intensity per subnet, packet sizes and packets per flow.

20. The method of claim 18, wherein the method further comprises activating/deactivating monitoring of network traffic to be routed over one or more network links relevant to said network link of interest based at least in part on the result of said determining.

21. The method of claim 18, wherein the method further comprises activating/deactivating regulation of network traffic at one or more network nodes based at least in part on the result of said determining.

22. A networking method as claimed in claim 1, wherein:
the step of receiving network traffic data comprises receiving descriptive data associated with network traffic flows routed over said one or more network links relevant to said network link of interest;
said method further comprises generating a ratio for a selected one of packets flowing in a first direction to packets flowing in a second direction and packets of a first type to packets of a second type, using said received descriptive data; and
said step of determining comprises determining whether said network link of interest is being misused based at least in part on said generated ratio.

23. The method of claim 22, wherein the method further comprises activating/deactivating distributed monitoring of network traffic to be routed over one or more network links relevant to said network link of interest based at least in part on the result of said determining.

24. The method of claim 22, wherein the method further comprises activating/deactivating regulation of network traffic at one or more network nodes based at least in part on the result of said determining.

25. The method of claim 1, wherein said step of determining whether said network link of interest is being misused includes determining whether the network link of interest is encountering a denial-of-service attack.

26. The method of claim 1, wherein said network link of interest is on a path between a switch or router and a server.

27. The method of claim 1, wherein said network traffic data includes at least one of source addresses, destination addresses, packet types, packet sizes, and volumes of packets.

28. The method of claim 1, further comprising receiving additional network traffic data associated with said network traffic metrics in response to determining that a suspicion exists that said network link of interest is being misused.

29. The method of claim 1, further comprising relaxing any regulation of said network link of interest in response to determining that said network link of interest is not being misused.

30. The method of claim 1, wherein the plurality of network traffic metrics are user defined.

31. The method of claim 1, wherein traffic on said network link of interest exceeding a user defined threshold for a predetermined period is deemed to be indicative of misuse of said network link of interest.

32. The method of claim 1, wherein the step of determining whether the network link of interest is being misused comprises determining a proportion of TCP ACK packets.

33. An apparatus comprising
storage medium having stored therein executable instructions designed to implement a plurality of network link misuse determination functions including
a receiving function to receive threshold specifications for a plurality of network traffic metrics defining an expected network traffic pattern for one or more network links relevant to a network link of in crest,
a determination function to receive network traffic data associated with said network traffic metrics, and in response, determine whether said network link of interest is being misused based on said received network traffic data and said received threshold specifications for said network traffic metrics defining said expected network traffic pattern for said network link of interest; and
one or more processors coupled to the storage medium to execute the instructions.

34. The apparatus of claim 33, wherein said receiving function is designed to receive threshold specifications for a plurality of network traffic metrics for a plurality of network traffic types.

35. The apparatus of claim 33, wherein
at least one of said network links is a virtual network link comprising a plurality of physical network links;
said receiving function is designed to receive threshold specifications for said plurality of network traffic metrics for said virtual network link;
said determining function is designed to receive network traffic data associated with said network traffic metrics for said plurality of physical network links and in response, aggregate said received network traffic data related to said physical network links to generate network traffic data associated with said network traffic metrics for said virtual network link.

36. The apparatus of claim 33, wherein said determining function is further designed to activate/deactivate monitoring of network traffic relevant to said network link of interest based at least in part on the result of said determining function.

37. The apparatus of claim 33, wherein the instructions are further designed to implement a regulation function that activates/deactivates regulation of selected network traffic at one or more network nodes based at least in part on the result of said determining function.

38. The apparatus of claim 33, wherein the instructions further implement a control function to control said receiving function and said determining function to repeat said receiving of network traffic data, and said determining of misuse, and to automatically adjust said received threshold specifications to be employed by said determining function in a next repetition of said determining, based at least in part on the result of one or more prior performance of said determining.

39. An apparatus as claimed in claim 33, wherein said storage medium further includes:
a database establishing function to establish a database of allocated IP addresses,
wherein the receiving function receives source addresses of network traffic routed over one or more network links relevant to a network link of interest, and
the determination function determine if said network link of interest is being misused based on said established database of IP addresses and said received source addresses of network traffic routed over said one or more network links relevant to said network link of interest.

40. The apparatus of claim 39, wherein said database establishing function is designed to establish said database by systematically pinging IP addresses for replies.

41. The apparatus of claim 39, wherein said receiving function is further designed to activate/deactivate monitoring of network traffic to be routed over one or more network links relevant to said network link of interest based at least in part on the result of said determining function.

42. The apparatus of claim 39, wherein the instructions are further designed to implement a regulation function that activates/deactivates regulation of selected network traffic at one or more network nodes based at least in part on the result of said determining function.

43. An apparatus as claimed in claim 33, wherein
the receiving function receives source addresses of network traffic routed over said one or more network links relevant to said network link of interest,
said apparatus further comprises a generation function to generate a distribution profile of said received source addresses, and
wherein the determination function comprises:
a first determination function to determine one or more characteristic measures for said generated distribution profile, and
a second determination function to determine whether said network link of interest is being misused based on said one or more determined characteristic measures of said distribution profile.

44. The apparatus of claim 43, wherein said generation function is designed to accept a subnet range specification, and generates said distribution profile for said specified subnet range.

45. The apparatus of claim 43, wherein said receiving function is further designed to activate/deactivate monitoring of network traffic to be routed over one or more network links relevant to said network link of interest based at least in part on the result of said determining function.

46. The apparatus of claim 43, wherein the instructions are further designed to implement a regulation function that activates/deactivates regulation of selected network traffic at one or more network nodes based at least in part on the result of said determining function.

47. An apparatus as claimed in claim 33 wherein
said receiving function receives source addresses, destination addresses and traffic types of network traffic routed over said one or more network links relevant to said network link of interest,
said determination function comprises
a first determination function to determine a transmission frequency for a type of network traffic transmitted from a source address to one or more destination addresses, and
a second determination function to determine whether said network link of interest is being misused based on whether said determined transmission frequency is consistent with said network traffic type.

48. The apparatus of claim 47, wherein said receiving function is further designed to activate/deactivate monitoring of network traffic to be routed over one or more network links relevant to said network link of interest based at least in part on the result of said determining function.

49. The apparatus of claim 47, wherein the instructions are further designed to implement a regulation function that activates/deactivates regulation of selected network traffic at one or more network nodes based at least in part on the result of said determining function.

50. An apparatus as claimed in claim 33, further comprising
a generator function to receive descriptive data associated with network traffic routed over one or more network links relevant to a network link of interest, and in response, generate at least one measurement metric that normally exhibits a bursty characteristic during normal operation, and
wherein said determination function determines whether said network link of interest is being misused based on whether said at least one generated measurement metric exhibits said bursty characteristic.

51. The apparatus of claim 50, wherein said at least one generated measurement metric comprises at least a selected one of traffic intensity, intensity per subnet, packet sizes and packets per flow.

52. The apparatus of claim 50, wherein said receiving function is further designed to activate/deactivate monitoring of network traffic to be routed over one or more network links relevant to said network link of interest based at least in part on the result of said determining function.

53. The apparatus of claim 50, wherein the instructions are further designed to implement a regulation function that activates/deactivates regulation of selected network traffic at one or more network nodes based at least in part on the result of said determining function.

54. An apparatus as claimed in claim 33, further comprising
a generation function to receive descriptive data associated with network traffic flows routed over said one or more network links relevant to said network link of interest and in response, generate a ratio for a selected one of packets flowing in a first direction to packets flowing in a second direction and packets of a first type to packets to a second type, using said received descriptive data, and wherein said a determination function determines whether said network link of interest is being misused based at least in part on said generated ratio.

55. The apparatus of claim 54, wherein said receiving function is further designed to activate/deactivate monitoring of network traffic to be routed over one or more network links relevant to said network link of interest based at least in part on the result of said determining function.

56. The apparatus of claim 54, wherein the instructions are further designed to implement a regulation function that activates/deactivates regulation of selected network traffic at one or more network nodes based at least in part on the result of said determining function.

57. The apparatus of claim 33, wherein said determination function determines whether the network link of interest is encountering a denial-of-service attack.

58. The apparatus of claim 33, wherein said network link of interest is on a path between a switch or router and a server.

59. The apparatus of claim 33, wherein said network traffic data includes at least one of source addresses, destination addresses, packet types, packet sizes, and volumes of packets.

60. The apparatus of claim 33, wherein said receiving function further receives additional network traffic data associated with said network traffic metrics in response to said determination function determining that a suspicion exists that said network link of interest is being misused.

61. The apparatus of claim 33, further comprising relaxing any regulation of the network link of interest in response to determining that the network link of interest is not being misused.

62. The apparatus of claim 33, wherein the plurality of network traffic metrics are user defined.

63. The apparatus of claim 33, wherein traffic on said network link of interest exceeding a user defined threshold for a predetermined period is deemed to be indicative of misuse of said network link of interest.

64. The apparatus of claim 33, wherein said determination function determines whether the network link of interest is being misused by determining a proportion of TCP ACK packets on the network link of interest.

* * * * *

UNITED STATES PATENT AND TRADEMARK OFFICE
CERTIFICATE OF CORRECTION

| | |
|---|---|
| PATENT NO. | : 8,509,086 B2 |
| APPLICATION NO. | : 10/176845 |
| DATED | : August 13, 2013 |
| INVENTOR(S) | : Thomas E. Anderson et al. |

Page 1 of 1

It is certified that error appears in the above-identified patent and that said Letters Patent is hereby corrected as shown below:

In the Claims:

At Column 12, Claim 33, Line 43, change "in crest" to --interest--.

Signed and Sealed this
Eighth Day of October, 2013

Teresa Stanek Rea
*Deputy Director of the United States Patent and Trademark Office*